Oct. 15, 1968  V. E. GONSALVES ET AL  3,405,556

APPARATUS FOR MEASURING THE TWIST OF A CORD

Filed July 18, 1966

INVENTORS
Victor E. Gonsalves,
Onno T. DeVries

BY *Stevens, Davis, Miller & Mosher*
ATTORNEYS

3,405,556
APPARATUS FOR MEASURING THE TWIST OF A CORD
Victor E. Gonsalves and Onno T. De Vries, Arnhem, Netherlands, assignors to Algemene Kunstzijde Unie N.V., Arnhem, Netherlands, a corporation of the Netherlands
Filed July 18, 1966, Ser. No. 566,137
Claims priority, application Netherlands, Aug. 13, 1965, 6510579
6 Claims. (Cl. 73—160)

This invention relates to an apparatus for measuring the twist of a cord running past a twist pickup means. In particular, this invention relates to an apparatus having a counting device that counts the number of humps in the cord observed by the twist pickup means and that operates only during a given movement of the cord.

It is to be understood that the term "cord" is meant to define a multi-ply yarn made up of at least two component yarns, which are twisted together and can be distinguished in the final cord as separate components lying along regular helices. An example of such a multi-ply yarn is tire cord. In general, tire cord is made up of two or three component yarns. Furthermore, as used herein, the expression "twist of a cord" refers to the number of turns per unit length of each component yarn about the helix axis.

Heretofore it has been known to measure the twist of yarns, cords, and the like by means of a twist tester on which a piece of cord, yarn, or the like of a given length is clamped between two clamps. In this device, the piece of cord is subsequently untwisted; the number of turns required to lay the component yarns in parallel arrangement being taken as the twist figure. A measuring method of this type involves much work and is, moreover, destructive, because the untwisted, tested yarn is no longer fit for further use.

Furthermore, another apparatus is known for obtaining a statistical insight into the irregularities of the twist of a cord in which the cord is moved past a twist pickup comprising a light source and a photoelectric cell. The light source serves to project the profile of the cord on to the photoelectric pickup. The humps of the cord observed by the pickup give rise to periodic variations in the strength of the electric signal emitted by the pickup. This signal is converted into a pulse-signal consisting of pulses that are produced each time the light source projects a recess between two humps on the cord. The pulse period corresponds to the interval between two successive cord humps. In this known apparatus the measured twist irregularity is based on the irregularity of the pulse periods. This irregularity is determined with the aid of a time-base system consisting of a series of channels which are electrically excited one after another. The first channel is always excited by the pulses of the pulse signal. The channel then supplies an abruptly increased voltage which is for a time $t_0$ maintained at a given level. When this time has elapsed the voltage drops to the initial value, after which the second channel is excited. This channel in its turn supplies an abruptly increased voltage which is maintained for a time $t_k (t_k \ll t_0)$. As soon as this voltage drops to the initial value, the third channel is excited. Likewise, the fourth up to and including the last channel are successively excited. In the second channel and in each following channel, after it has been excited, the voltage is maintained at an increased value for the same time $t_k$. Each of these last-mentioned channels co-operates with a counting device. The interval between two successive pulses is measured as follows. After the first of the two pulses has excited the time base, it is determined which channel is in the excited state when the next pulse is produced. The value recorded by the counter co-operating with this channel is then increased by one unit. For example, for the $n$th channel the time interval T follows from the relationship:

$$t_0 + (n-2)t_k < T < t_0 + (n-1)t_k$$

If with this apparatus the twist of, for instance, a one meter long cord is to be measured, then the values recorded by the counters during the time in which one meter of cord has passed are summed. With this known apparatus the twist is thus determined by the number of cord humps per unit time. However, since the twist is expressed as the number of turns per unit length, it is in the case of the known apparatus necessary that the cord speed be kept constant.

In contrast to this known apparatus the apparatus according to this invention has the advantage that the number of cord humps countered in directly based on the length of cord measured. It is not strictly necessary in accordance with the present invention for the cord speed to be kept constant.

Thus the invention contemplates an apparatus for measuring the twist of a cord which comprises twist pickup means for observing the humps in the cord to be twisted, counting means for counting the humps in the cord observed by the pickup means, a rotatably supported disk over which the cord is passed, guide means for guiding the cord over the disk whereby the cord travels at a speed which is equal to the circumferential speed of the disk at the point where the disk is in contact with the cord and control means for insuring that the counting means is in operation only during the time when the disk makes a given angular displacement.

In accordance with this invention, a variety of devices may be used as twist pickup means for observing the humps in the cord to be tested. For example, use could be made of an easily movable feeler pin over which the cord is passed. The periodic deflection of the pin brought about by its contact with the cord may, for instance, be converted into an electric signal. The number of periods of this signal for a given cord length is thus a measure of the twist.

Also, it is possible for the cord to be guided past a pneumatic twist pickup which is provided with an opening from which air issues so that it flows against the cord. The resistance to which the outflowing air is subjected will then show periodic variations, which may be utilized for determining the degree of twist therein.

Advantageously, a photoelectric pickup such as described heretofore provides a high measuring speed.

The control means which insure that counting takes place only while the disk is turned through a given angle preferably comprise a marking device co-operating with the disk. The marking device puts a counting device in operation when the disk is in a given initial angular position and causes the counting device to stop when the disk is in a given terminal angular position: the initial and terminal positions bounding the angular displacement.

The marking device may be provided with electric contacts which are placed on the disk and which co-operate with stationary contacts. The counting device may be caused to count then during the measuring time defined by these contacts. Disadvantages of this arrangement are that the disk is subjected to an additional load, as a result of which there is a chance of slippage of the cord on the disk. Moreover, an accurately defined contact control is difficult to realize. It is therefore preferred that the marking device comprise a light source and a photoelectric pickup and that in the path travelled by the light between the light source and the photoelectric cell, the disk has a portion which causes a perceptible variation in the photoelectric signal when the disk takes up the initial or terminal angular position during rotation. This disk portion may be translucent, non-translucent or reflective. In this manner, the marking device insures that the test length is accurately determined so that the counting device registers only those cord humps that are within the given test length.

A particularly effective embodiment of the marking device is characterized in that the portion of the disk is formed by an aperture, the width of which is adjustable in tangential direction of the disk.

It will be appreciated that the moving cord may drive the disk, or the disk may drive the cord. It is preferred to use an apparatus characterized in that the cord, through friction, drives the disk.

This simple driving system is possible because the disk may be so mounted that it rotates very lightly. On the other hand, if the cord is driven, by the disk, a much greater driving force will be required, because it is then necessary to overcome the tension of the cord.

In accordance with this invention, it is preferred to feed the cord to the apparatus by way of a yarn tensioning device of the hysteresis type. When use is made of such a device, the tensile force on the cord length to be tested is kept substantially constant irregardless of the speed of the cord as it passes through the tensioning device. Advantageously, with such a device the appropriate tensile force on the cord length to be tested will still be maintained when it is desired to change to a different cord speed or when the cord speed is subject to variations.

It will be appreciated that the geometrical character of the cord to be tested is thus utilized by this invention and is preferably observed in a view transverse to its length. The individual components of the cord are in this manner visible on its circumference as alternating regular humps.

The invention will now be further described with reference to the accompanying drawing in which.

Figure 1:
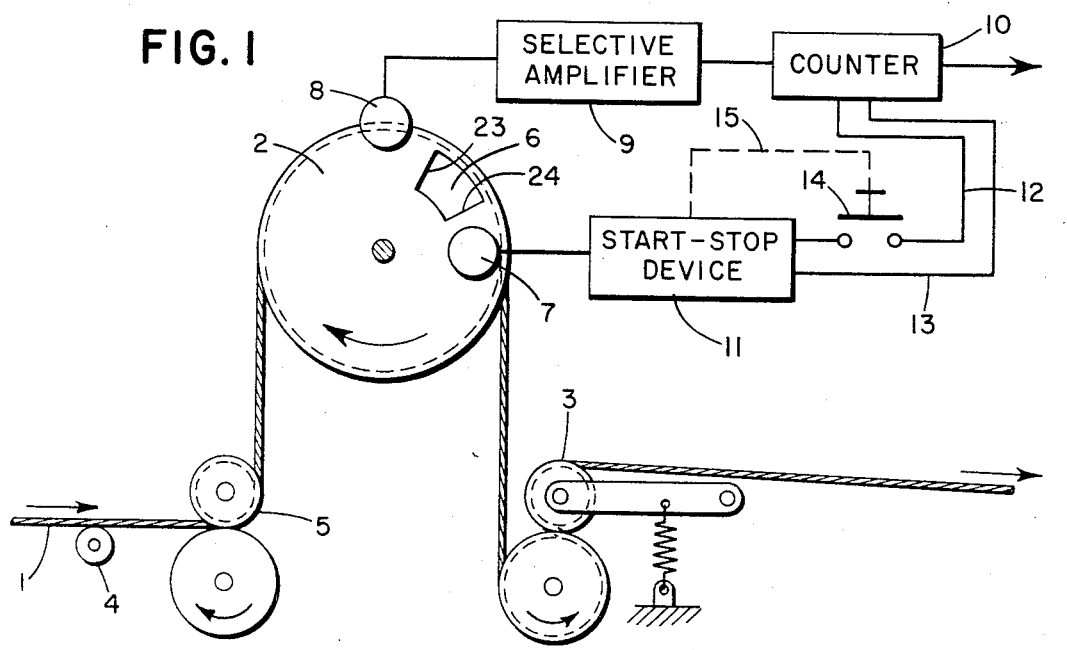
FIGURE 1 shows a schematic view of the apparatus for measuring the twist of a cord.

In FIGURE 1 the reference numeral 1 refers to a tire cord made up of two component yarns which are twisted together. The cord 1 is passed around a rotatably supported disk 2 and may be displaced or moved in the direction indicated by the arrow with the aid of a transport mechanism 3. Before the cord engages the disk 2, it passes through a guide 4 and a yarn tensioner 5 of the hysteresis type, which, independently of the speed of the cord, exerts a constant tensile force thereon. The disk 2 is provided with an aperture 6, through which there may pass the light of a light source (not shown in FIGURE 1).

The aperture 6 has two straight edges 23 and 24 which are spaced apart an arcuate distance which is adjustable in a tangential direction.

When the disk rotates, the aperture passes in front of a fixedly mounted photocell 7. A second photocell 8, which will hereinafter be referred to as twist pickup, is fixedly mounted near the edge of the disk 2. On the photocell 8 there falls the light of a light source which is directed to the cord 1. The arrangement is such that, viewed in the plane of the drawing, this light source projects only the upper part of the cord onto the photocell 8.

The photocell 8 controls and sends pulses to a counter 10 by way of a selective amplifier 9. The counter 10 is further controlled by a start-stop device 11, the input of which is connected with the photocell 7. The start-stop device 11 may give a start signal to the counter 10 via line or connection 12 and a stop signal via line or connection 13.

A switch 14 may be operated either by hand, or, through a line 15, by the start-stop device 11.

Figure 2:
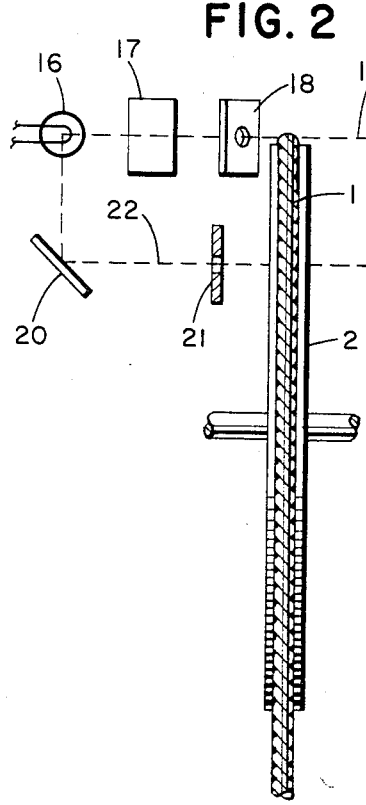
FIGURE 2 shows, in side elevation, an embodiment of an optical system for observing the cord humps.
Figure 3:
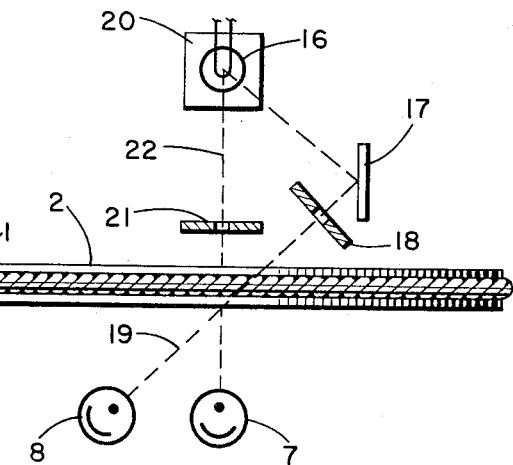
FIGURE 3 illustrates the optical system in a plane view.

Although the photocells 7 and 8 are shown positioned away from each other in FIGURE 1, a more compact construction may be obtained if use is made of the arrangement illustrated in FIGURES 2 and 3, which only show the optical system and the photocells. In these figures the parts or elements corresponding to those of FIGURE 1 are referred to by like reference numerals. A light source 16 casts, via mirror 17 and a stop member or control opening 18, a narrow light beam 19 on the upper side of the cord 1, which light beam subsequently impinges on the photocell 8.

As can be seen from FIGURE 3, the light beam 19 is directed along the helix formed between the yarn components. In this way it is possible to obtain the largest possible variation in the signal from the photocell 8.

By way of a mirror 20 and a stop member 21 the same light source 16 casts light on the photocell 7. The mirror 20 and the stop member 21 are so positioned that the light beam 22 may pass through the aperture in the disk 2 and fall on the photocell 7.

The operation of the above apparatus will now be described with reference to FIGURE 1. In this description it is assumed that the counter 10 is in its standby position and only requires a start signal at its input 12 to begin counting.

When the edge 23 of the aperture 6 passes in front of the photocell 7, the cell emits an electric pulse to the start-stop device 11. This device then delivers the start signal to the counter 10. The counter 10 starts counting the pulses fed to its input which are formed as a result of the variations in light intensity observed by the photoelectric twist pickup 8 during movement of the cord 1. The selective amplifier 9 only amplifies the signals having a frequency that falls within a predetermined band. The lower and upper limits of this frequnecy band are governed by the minimum and maximum twist, respectively, which the apparatus is required to measure. Counting now takes place for the time required by the cord 1, after counting has been started, to be displaced along a distance equal to the test length.

The measuring time corresponding to the test length is finished as soon as the edge 24 of the aperture 6 is in front of the photocell 7. The pulse which the photocell 7 then emits to the start-stop device 11 makes this device emit a stop signal through line 13 to the counter 10. The pulse emitted by the photocell 7 also causes the switch 14 to open. It is then impossible for the start-stop device 11 to emit another start signal immediately when the following revolution begins. The count may now be read out and punched into a tape or printed, or be processed or transported in any other suitable way. As soon as the count has been processed, the switch 14 may be closed again under the influence of the start-stop device, after which a new measuring cycle may begin.

It is also possible to provide an arrangement so that the distance between successive cord lengths, of which the twist is to be measured, is adjustable. This may be realized, for instance, by having the photocell 7 control a second counter, which forms part of the start-stop device and closes the switch 14 only once for a predetermined, adjustable number of revolutions of the disk 2.

It will be clear that the measuring cycle is determined by the movement of the cord itself. The duration of the measuring cycle is defined by the edges 23 and 24 of the aperture 6. The edge 23 defines the initial angular position of the disk, i.e., the beginning of the measuring cycle and the edge 24 defines the terminal angular position of the disk, i.e., the end of the measuring cycle. Thus these positions define the angular displacement of the disk during which the cord humps are counted. Consequently, it is necessary that the beginning of the counting is initiated by the trailing edge of the pulse emitted by the photocell 7 and the end, by the leading edge of said pulse. This control may be realized with the aid of an AND-type gate circuit to which are fed both the pulse emitted by the photocell 7 and a pulse which is delayed with respect thereto.

If the arcuate distance between the two edges 23 and 24 measured along the larger arc at the circumference of the disk, corresponds to 50 cm., then the count immediately indicates the twist, provided that the cord is made up of two component yarns.

It will be appreciated that the apparatus may be applied in combination with a method and an apparatus such as described in the copending application of Adrianus K. G. Korzilius, Ser. No. 548,316 filed May 6, 1966 for measuring the mass per unit length of elongated products, e.g., threads and the like. In this arrangement, the tire cord is successively passed through the apparatus of this invention and then through the apparatus according to the above-identified patent application, so that both the twist and the linear density of a continuous cord can be measured. Since both measurements are non-destructive, the cord may further be passed through an apparatus by which its elongation and, finally, its breaking strength are measured.

While the novel features of the invention have been shown and described and are pointed out in the appended claims, it is to be understood that various omissions, substitutions and changes in construction and arrangement of the features shown and described may be made by those skilled in the art without departing from the spirit and scope of the invention.

What is claimed is:

1. An apparatus for measuring the twist of a cord which comprises twist pickup means for observing the humps in the cord to be tested, counting means for counting the humps of the cord observed by the pickup means, a rotatably supported disk over which the cord is passed, guide means for guiding the cord whereby the cord travels at a speed which is equal to the circumferential speed of the disk at the point where said disk is in contact with the cord, and control means for insuring that the counting means is in operation only during the time the disk makes a given angular displacement.

2. The apparatus of claim 1 in which said control means includes a marking means co-operating with the disk, said marking means causing the counting means to operate when the disk is in a given initial angular position and causing the counting means to stop when the disk is in a given terminal angular position, said initial and terminal positions bounding the angular displacement of the disk during a measuring cycle.

3. The apparatus of claim 2 in which the marking means comprises a light source and a photoelectric pickup, said disk having a portion in the path travelled by the light between the light source and the photoelectric pickup which causes a perceptible variation in the photoelectric signal of the pickup when the disk takes up the initial and terminal angular positions during rotation.

4. The apparatus of claim 3 in which said portion of the disk is formed by an aperture the width of which is adjustable.

5. The apparatus of claim 1 in which the cord drives the disk by frictional contact therewith.

6. The apparatus of claim 1 in which the guide means includes a yarn tensioning device of the hysteresis type for feeding the cord to said disk.

References Cited

UNITED STATES PATENTS

| | | |
|---|---|---|
| 2,874,899 | 2/1959 | Roehrig. |
| 3,063,293 | 11/1962 | Hutchens et al. _____ 73—160 |
| 3,303,919 | 2/1967 | Gith. |
| 3,305,687 | 2/1967 | Vinzelberg et al. |

W. HENRY, *Assistant Examiner.*

DAVID SCHONBERG, *Primary Examiner.*